(12) United States Patent
Pai et al.

(10) Patent No.: US 10,115,121 B2
(45) Date of Patent: Oct. 30, 2018

(54) VISITOR SESSION CLASSIFICATION BASED ON CLICKSTREAMS

(71) Applicant: Adobe Systems Incorporated, San Jose, CA (US)

(72) Inventors: Deepak Pai, Bangalore (IN); Abhijit Sharang, Bhagalpur (IN); Meghanath Macha Yadagiri, Hyderabad (IN); Shradha Agrawal, Raya (IN)

(73) Assignee: Adobe Systems Incorporated, San Jose, CA (US)

( * ) Notice: Subject to any disclaimer, the term of this patent is extended or adjusted under 35 U.S.C. 154(b) by 817 days.

(21) Appl. No.: 14/103,056

(22) Filed: Dec. 11, 2013

(65) Prior Publication Data

US 2015/0161634 A1      Jun. 11, 2015

(51) Int. Cl.
*G06Q 30/02* (2012.01)
*G06F 17/30* (2006.01)
*H04L 29/08* (2006.01)

(52) U.S. Cl.
CPC ..... *G06Q 30/0204* (2013.01); *G06F 17/3089* (2013.01); *H04L 67/22* (2013.01); *H04L 67/02* (2013.01); *H04L 67/146* (2013.01)

(58) Field of Classification Search
None
See application file for complete search history.

(56) References Cited

U.S. PATENT DOCUMENTS

2012/0054209 A1* 3/2012 Priyadarshan .... G06F 17/30221
707/753

2012/0131187 A1* 5/2012 Cancel .................. G06Q 10/04
709/224

OTHER PUBLICATIONS

Aizawa, Akiko, "An information-theoretic perspective of tf-idf measures", Information Processing and Management, 39, (2003), 45-65.
Bucklin, Randolph E., et al., "A Model of Web Site Browsing Behavior Estimated on Clickstream Data", Journal of Marketing Research, vol. XL, (Aug. 2003), 249-267.
Chierichetti, Flavio, et al., "Are Web Users Really Markovian?", WWW 2012—Session: Web User Behavioral Analysis and Modeling, (Apr. 2012), 609-618.
Cover, T. M., et al., "Nearest Neighbor Pattern Classification", IEEE Transactions on Information Theory, vol. IT-13, No. 1, (Jan. 1967), 21-27.

(Continued)

*Primary Examiner* — Thomas L Mansfield
*Assistant Examiner* — Amanda Gurski
(74) *Attorney, Agent, or Firm* — Shook, Hardy & Bacon, L.L.P.

(57) ABSTRACT

Example systems and methods of classifying web visitor sessions based on clickstreams are presented. In one example, a plurality of web pages of a website is organized into a plurality of web page categories. A clickstream of each visitor to visit the plurality of web page categories of the website are divided into a plurality of visitor sessions. A mathematical distance between each of the plurality of visitor sessions is determined using a visitation metric based on the web page categories. Each of the visitor sessions is classified into a target group or a non-target group based on the mathematical distance between each of the visitor sessions and on an identification of at least one of the visitor sessions with an event corresponding to the target group.

18 Claims, 7 Drawing Sheets

(56) References Cited

OTHER PUBLICATIONS

Faloutsos, Michalis, et al., "On Power-Law Relationships of the Internet Topology", (1999), 12 pgs.
Joachims, Thorsten, "A Probabilistic Analysis of the Rocchio Algorithm with TFIDF for Text Categorization", (Mar. 1996), 26 pgs.
Li, Jinhua, et al., "Clustering User Session Data for Web Applications Test", Journal of Computational Information Systems 7: 9, (2011), 3174-3181.
Mensink, Thomas, et al., "Metric Learning for Large Scale Image Classification: Generalizing to New Classes at Near-Zero Cost", ECCV—European Conference on Computer Vision (2012), (2012), 14 pgs.
Moe, Wendy W., "Buying, Searching or Browsing: Differentiating between Online Shoppers Using In-Store Navigational Clickstream", Journal of Consumer Psychology, vol. 13, No. (1&2), (2003), 29-39.
Montgomery, Alan L., "Modeling Online Browsing and Path Analysis Using Clickstream Data", (Feb. 2004), 36 pgs.
Newman, M. E.J., "Power laws, Pareto distributions and Zipf's law", Cond. Mat. Stat. Mech, (May 29, 2006), 28 pgs.
Petridou, Sophia G., et al., "Time Aware Web Users Clustering", IEEE Transactions on Knowledge and Data Engineering, (2007), 15 pgs.
Poggi, Nicolas, et al., "A Methodology for the Evaluation of High Response Time on E-commerce Users and Sales", (Oct. 2012), 17 pgs.
Scott, Steven L., et al., "A Nested Hidden Markov Model for Internet Browsing Behavior", (Dec. 2006), 26 pgs.
Sisneiro, Catarina, et al., "Modeling Purchase Behavior at an E-commerce Web Site: A Task Completion Approach", (Jan. 2004), 46 pgs.
Vandenberghe, Lieven, et al., "Semidefinite Programming", (May 1995), 59 pgs.
Weinberger, Kilian Q., et al., "Distance Metric Learning for Large Margin Nearest Neighbor Classification", (2006), 8 pgs.
Wu, Ho Chung, et al., "Interpreting TF-IDF Term Weights as Making Relevance Decisions", ACM Transactions on Information Systems, vol. 26, No. 3, Article 13, (Jun. 2008), 37 pgs.
Ypma, Alexander, et al., "Categorization of web pages and user clustering with mixtures of hidden Markov models", (2002), 13 pgs.

\* cited by examiner

VISITOR SESSION CLASSIFICATION BASED ON CLICKSTREAMS

FIELD

This application relates generally to data processing and, in an example embodiment, to classifying visitor sessions on the World Wide Web using clickstreams.

BACKGROUND

Online commercial entities often engage in a variety of marketing strategies to increase conversion rates, which may be, for example, the percentage of visitors to a website of a online business that ultimately buy a product or service supplied via the website. One example of a popular marketing strategy employs market segmentation, in which a business may divide a group of potential customers, such as previous visitors to the website, into various subgroups according to their common purchasing characteristics or traits. The business may then tailor advertising, purchase offers, coupons, discounts, and the like to each identified consumer subgroup according to the perceived needs of that group in the hope that a greater number of people in each group will be motivated to purchase products or services from the business.

Typically, the business bases its market segmentation process on relatively static characteristics of each member of the overall customer group, such as, for example, age, gender, geographic location, marital status, number of children, income level, and the like. However, the use of such information often does not result in conversion rates significantly greater than what may be expected from randomly segmenting the potential customer group. Consequently, significant resources, such as money and employee time, that are typically invested in market segmentation using static customer characteristics may ultimately result in little-to-no positive economic return for the business entity.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Illustrative embodiments, described in greater detail below, include methods and systems for classifying web visitor sessions to a website based on the "clickstream" (e.g., the stream of visitor selections of the various web pages of the website) of each visitor. In one example, web pages of the website may be organized into multiple web page categories. Also, a clickstream of each visitor in visiting the web page categories of the website may be divided into a number of visitor sessions. Using a visitation metric based on the web page categories, a mathematical distance between each of the visitor sessions may be determined. Each of the visitor sessions may then be classified into a target group or a non-target group based on the mathematical distances and an identification of at least one of the sessions with an event corresponding to the target group.

In one particular example, the website may offer a product or service for purchase, lease, rental, or other transaction. By associating the target group with visitors that have engaged in a transaction with the website, the classifying of visitor sessions may result in successfully identifying sessions of other visitors that are more likely than others to engage in a similar transaction. An entity associated with the website may then direct advertising, special offers, and other marketing or sales activities to the visitors corresponding to the identified sessions of the target group.

In some examples, the determining of the mathematical distances between visitor sessions may involve calculating a metric associated with each web page category, such as, for example, a number of clicks or visits to each web page category, or a visit duration to each web page category. The determining of the mathematical distances may also involve the use of a learning algorithm, such as, for example, a large margin nearest neighbor (LMNN) algorithm. In some implementations, the resulting mathematical distances may then be used to classify or group the visitor sessions using a k-nearest neighbor (kNN) algorithm.

The description that follows includes illustrative systems, methods, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Figure 1:
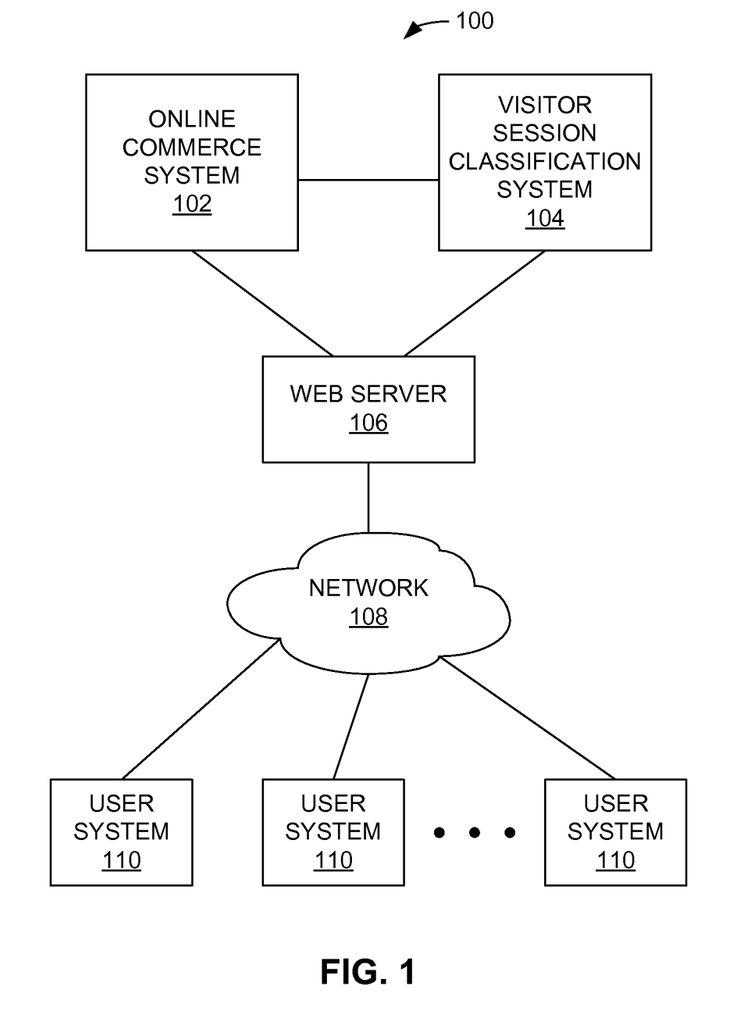
FIG. 1 is a block diagram of an example communication system including a visitor session classification system capable of employing the systems and methods described herein.

FIG. 1 is a block diagram of an example communication system 100 including a visitor session classification system 104 capable of employing the systems and methods described herein. In an implementation, the communication system 100 may include an online commerce system 102, a web server 106, a network 108, and multiple user systems 110. Examples of the user systems 110 may include, but are not limited to, a desktop computer, a laptop computer, a tablet computer, a smart phone, a personal digital assistant (PDA), a television set-top box, a gaming system, or any other system capable of communicating with the online commerce system 102 via the network 108 and the web server 106. In some examples, the user systems 110 may use a web browser to communicate with the online commerce system 102 via the web server 106. In other examples, at least one of the user systems 110 may execute a programmatic client to communicate with the online commerce system 102 via an application programming interface (API) server (not shown in FIG. 1) in lieu of the web server 106.

The network 108 may be any communication network employable by the user systems 110 to communicate with the web server 106 and the online commerce system 102. Examples of the communication network 108 may include, but are not limited to, a wide area network (WAN) (e.g., the Internet), a local area network (LAN) (e.g., an Ethernet or Wi-Fi® network), a cellular communication network (e.g., a third generation (3G) or fourth generation (4G) cellular network), or any combination thereof.

The web server 106 is configured to deliver web content provided by the online commerce system 102 via the network 108 to the user systems 110. More specifically, the web server 106 may host a website that may include multiple web pages that a user may visit using one of the user systems 110. Accordingly, the web server 106 may deliver a web page to a user system 110 via the network 108 in response to a request for that web page from the user system 110. Additionally, the web server 106 may receive other information, such as search queries, product selections, payment information, and so on, that has been entered into a web page via the user system 110, and may forward that information onto the online commerce system 102 for processing.

The online commerce system 102 may provide a website including multiple web pages for use by a web page visitor (e.g., a user of a user system 110) to engage in commerce with the online commerce system 102. For example, the website may be any commercial website that facilitates the purchase, rental, or other commercial activity of one or more products or services. In other examples, the website may be an informational website that is associated with commerce in some manner. The types of web pages provided at the website may include, but are not limited to, home web pages, product-specific or service-specific web pages, user account web pages, informational web pages, shopping cart web pages, help information web pages, product or service ordering web pages, search web pages, and product or service category web pages. Similarly, if the online commerce system 102 employs an API server instead of the web server 106 for communication with a user system 110, an application executing on the user system 110 may present commercial information to the user system 110 in information sets analogous to the individual web pages discussed above for interaction between the user system 110 and the online commerce system 102.

The visitor session classification system 104, as explained in greater detail below, may analyze the interaction between each of the user systems 110 and the online commerce system 102 to perform a visitor session classification function, such as segmenting the various visitors to the website provided by the online commerce system 102 to identify groups of similar visitors. Such group identification may be employed for the purpose of targeting advertising, coupons, special offers, and the like to specific visitor groups. Other potential aspects of the visitor session classification system 104 and related embodiments are discussed in greater detail below.

Figure 2:
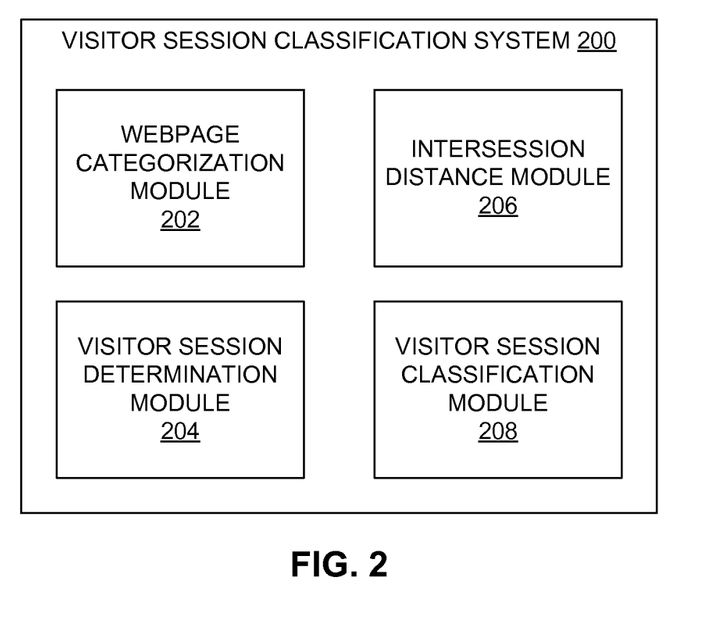
FIG. 2 is a block diagram of an example visitor session classification system.

FIG. 2 is a block diagram of an example visitor session classification system 200 that may serve as, for example, the visitor session classification system 104 of FIG. 1. As illustrated in FIG. 2, the visitor session classification system 200 may include a webpage categorization module 202, a visitor session determination module 204, an intersession distance module 206, and a visitor session classification module 208. In various examples, some modules of FIG. 2 (and FIG. 3, described below) may be combined with others, or subdivided into further modules. Also, some of these modules may be omitted while others may be added in some implementations.

The webpage categorization module 202 may organize a plurality of web pages provided at a website into one or more web page categories. In at least some implementations, this web page categorization operation may simplify the overall task of classifying similar visitor sessions, thus reducing the overall amount of processing described below without significantly impacting the effectiveness of the classification task.

The visitor session determination module 204 may divide the clickstream of each website visitor into one or more continuous visitor sessions based on gaps in time between consecutive "clicks" or web page selections of the visitor. As used herein, a visitor session is a portion of the user clickstream occurring over some contiguous length of time. As described more completely below, the beginning and end of a visitor session may be defined by gaps in time between visitor sessions exceeding some threshold time period during which no user activity occurs involving the website. In some implementations, employing individual visitor sessions, as opposed to individual visitors, may provide more accurate market segmentation results since each individual visitor may have different goals for each session in which the visitor engages with the website. For example, a visitor may dedicate one or more initial sessions at the website to gathering information regarding various purchase options, possibly looking at different types of products during each session. After these initial sessions, the visitor may either not return to the website (as the visitor does not have any intention of purchasing a product at the website), or return to the website to focus attention on a particular product, and possibly purchase that produce. As a result, as a single visitor may exhibit a heterogeneous mixture of interests and activities over multiple sessions, focusing on individual visitor sessions may result in more effective targeting of visitors that are seriously considering a potential purchase. The session identification functionality is described in greater detail below in conjunction with FIGS. 5 and 6.

The intersession distance module 206 may determine a mathematical "distance" between or among the various visitor sessions based on at least one visitation feature or metric for a visitor session based on the web page categories. Example visitation metrics include, but are not limited to, a visit count (e.g., a number of times a visitor selects web pages of a particular web page category during the session) and a visit duration (e.g., a length of time a visitor spends at web pages of a particular web page category during the session). In other implementations, any measurable aspect or characteristic of the interaction of the visitor with each webpage category of the website may serve as a visitation metric. Generally, the less the mathematical distance between two individual visitor sessions, the greater the similarity of the visitor sessions. More detail regarding the determination of these mathematical distances is presented below in conjunction with FIGS. 3, 7, and 8.

The visitor session classification module 208 may classify each of the visitor sessions into at least a target group and a non-target group based on the mathematical distances between the visitor sessions, as well as on an identification of at least one of the visitor sessions with an event corresponding to the target group. For example, a target group may be a group of visitor sessions which are similar to at least one visitor session that resulted in a desired event, such as a product or service purchase via the website.

Figure 3:
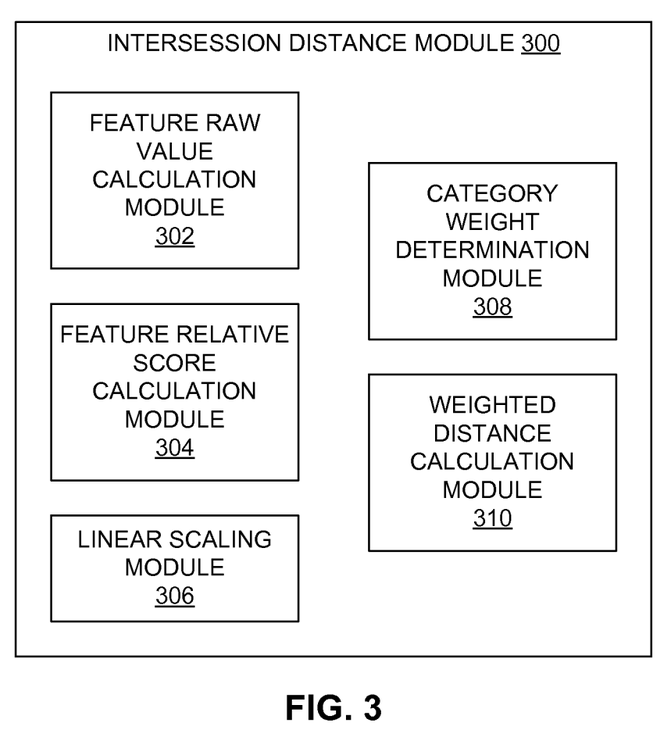
FIG. 3 is a block diagram of an example intersession distance module of the visitor session classification system of FIG. 2.

FIG. 3 is a block diagram of an example intersession distance module 300, such as the intersession distance module 206 of the visitor session classification system 200 of FIG. 2. The intersession distance module 300, as shown in FIG. 3, may include a feature raw value calculation module 302, a feature relative score calculation module 304, a linear scaling module 306, a category weight determination module 308, and a weighted distance calculation module 310.

The feature raw value calculation module 302 may calculate a raw value for each visitation feature or metric for each web page category associated with a visitor session. The feature relative score calculation module 304 may compute or calculate a relative score for each visitation metric for each web page category potentially visited during a particular visitor session based on the corresponding raw value for that web page category that was calculated in the feature raw value calculation module 302. In one example, as discussed more fully below, the score may be a term frequency-inverse document frequency (tf-idf) score. Additionally, the linear scaling module 306 may linearly scale each of the scores for each visitation metric, such as, for example, in the range of zero to one.

Continuing with the intersession distance module 300 of FIG. 3, the category weight determination module 308 may determine or "learn" a mathematical weight of each visitation metric for each web page category. In one example, the mathematical weights are learned or determined using training data that includes data for visitor sessions and the target or non-target group with which each is associated. As is described in greater detail below, by possibly weighting a feature or visitation metric differently for each of the web page categories, differences in the web page categories relative to a particular visitation metric may be taken into account, possibly resulting in clearer or less ambiguous mathematical distance values associated with each pair of visitor sessions. Additionally, in some examples explained below, an additional set of differential weights may be applied to the learning process to distinguish between visitor sessions of a majority group (e.g., a group having more visitor sessions compared to another group) and visitor sessions of a minority group (e.g., a group having fewer visitor sessions compared to another group).

Given the weights from the feature weight determination module 308, the weighted distance calculation module 310 may calculate the mathematical distances between the various visitor sessions. An example of how the mathematical distances are calculated is presented in detail below. As mentioned above, the visitor session classification module 208 of FIG. 2 may employ these calculated mathematical distances to classify visitor sessions into a target group and a non-target group, possibly for market segmentation purposes.

Figure 4:
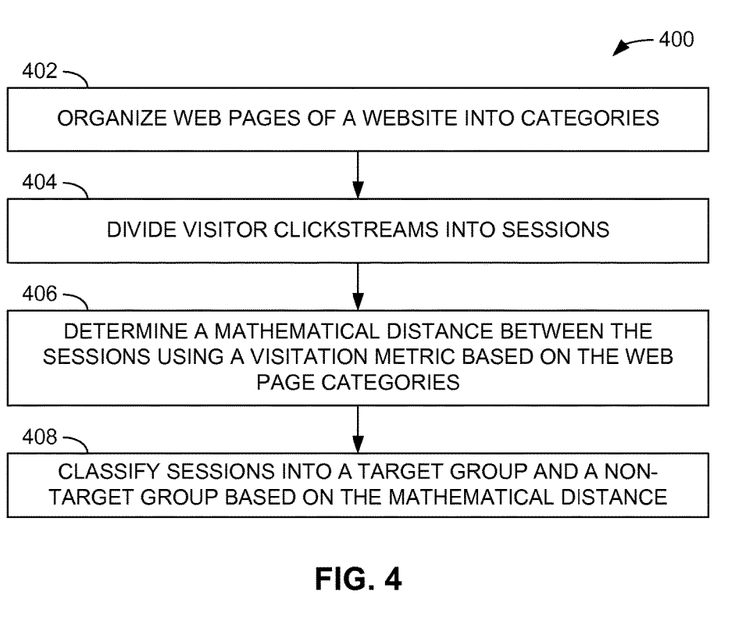
FIG. 4 is a flow diagram illustrating an example method of visitor session classification based on visitor session similarity.

FIG. 4 is a flow diagram illustrating an example method 400 of visitor session classification based on visitor session similarity, substantially as described above. While the various operations of the method 400 may be executed on the visitor session classification system 104 of FIG. 1 or the visitor session classification system 200 of FIG. 2, other applications, devices, and/or systems may be employed to perform the method 400 in other embodiments.

In the method 400, web pages of a website may be organized into web page categories (operation 402). Also, the clickstream for each visitor of the website may be divided into separate visitor sessions (operation 404). A mathematical distance between each of the visitor sessions may be determined based on the web page categories (operation 406). The visitor sessions may then be classified into a target group and a non-target group (such as, for example, for advertising activities, coupon distribution, provision of special offers, and the like) based on the mathematical distances (operation 408). While operations 402 through 408 of the method 400 of FIG. 4 are shown in a specific order, other orders of operation, including possibly concurrent or continual execution of at least portions of one or more operations, may be possible in some implementations of method 400, as well as other methods discussed herein.

More specifically concerning the organizing of the web pages into web page categories (operation 402), examples of the web page categories may include, but are not limited to, home pages, product-specific and/or service-specific web pages, user account web pages, general information web pages, online shopping cart web pages, help information web pages, product and/or service ordering web pages, product and/or service search web pages, and product and/or service category web pages. In other implementations, one or more of these web page categories may be subdivided into further categories, such as web page categories for each separate product or service category identified on the website. Other web page categories not specifically identified above may be employed in yet other examples.

As seen in the examples below, matrices may be employed to perform at least some of the calculations to generate the mathematical distances. Without web page categorization (operation 402), the resulting matrices representing the various visitor sessions would be sparse, possibly leading to poor computational performance of the algorithms discussed below.

Mathematically speaking, $U=\{u_1, u_2, \ldots, u_n\}$ is the set of unique web pages of the website, and $\text{Cat}=\{\text{cat}_1, \text{cat}_2, \ldots, \text{cat}_p\}$ is the set of web page categories defined for the website. Accordingly, a mapping function M may be specified that maps U to Cat:

$$M(u_i)=\text{cat}_j \forall u_i \in U | \text{cat}_j \in \text{Cat}$$

Figure 5:
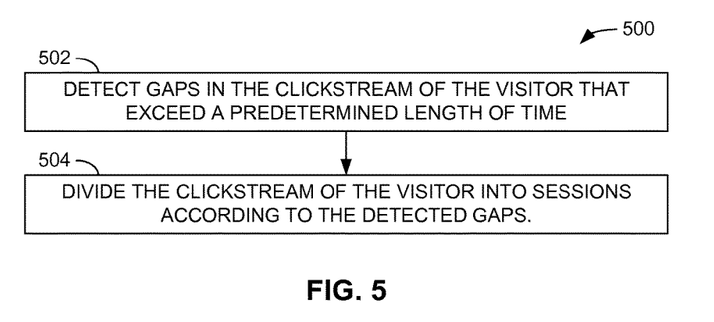
FIG. 5 is a flow diagram illustrating an example method of dividing a visitor clickstream into multiple visitor sessions.
Figure 6:
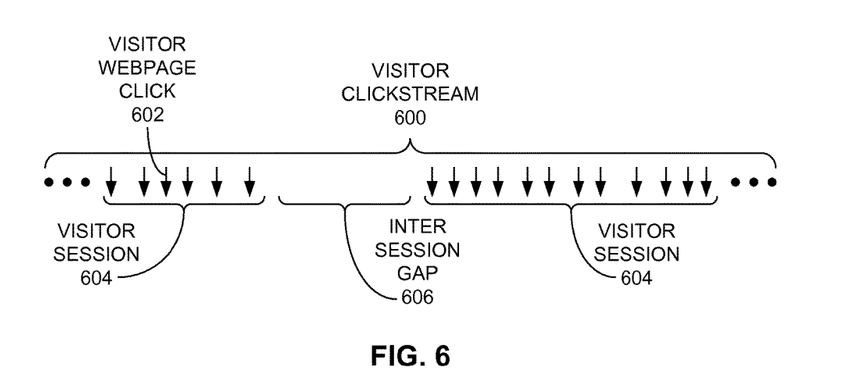
FIG. 6 is a graphical representation of visitor sessions identified in a visitor clickstream.

With respect to dividing the clickstream for each visitor of the website into separate visitor sessions (operation 404), FIG. 5 is a flow diagram of an example method 500 for providing that function. In the method 500, intersession gaps in the clickstream of a visitor that exceed a predetermined length of time are detected (operation 502), and the clickstream of the visitor is divided into visitor sessions according to the detected intersession gaps (operation 504). FIG. 6 is a graphical representation of such visitor sessions 604 identified in a visitor clickstream 600 of individual visitor webpage clicks 602, in which the visitor sessions 604 are identified by intersession gaps 606 that exceed the predetermined period of time, during which no webpage selections, or clicks, are provided by the visitor. In one example, the predetermined period of time is 30 minutes, although other predetermined time periods may be employed to identify the visitor sessions in other embodiments. Mathematically, $C_v=\{C_v^1, C_v^2, \ldots, C_v^q\}$ is the set of all of the clicks or selections, in order, of a clickstream of a visitor v, which may be stored in a log. Given $C_v$ and a predetermined period of time of 30 minutes, a session $C_v^s=\{C_v^i, \ldots, C_v^k\}$ for the visitor v such that i=1 or $T(C_v^i)-T(C_v^{i-1})>30\times60\times$ 1000, and $C_v^k$ is the last click recorded in the log for the visitor v or $T(C_v^{k+1})-T(C_v^k) > 30 \times 60 \times 1000$, where $T(C_v^k)$ is the timestamp of click $C_v^k$ in milliseconds.

Figure 7:
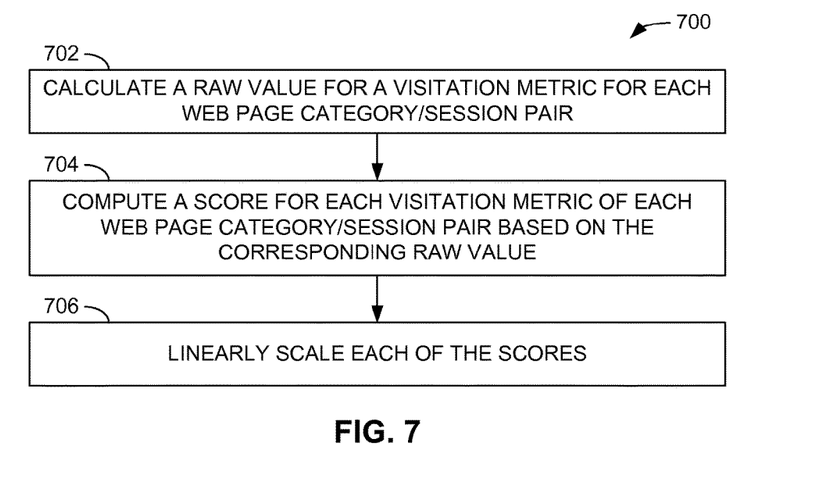
FIG. 7 is a flow diagram of an example method of generating a score for a visitation metric corresponding to each web page category for each visitor session.

Returning to FIG. 4, after the organization of web pages into web page categories (operation 402) and the dividing of visitor clickstreams into visitor sessions (operation 404), mathematical distances between visitor sessions is determined using at least one visitation metric based on the web page categories (operation 406). To that end, FIG. 7 is a flow diagram of an example method 700 of generating a score for each visitation metric corresponding to a webpage category and a visitor session. In the method 700, a raw value for a visitation feature or metric for each web page category during each visitor session may be calculated (operation 702).

While any of a number of features may be associated with each web page category visited during a visitor session, the example presented herein involves the possible calculation of two visitation features or metrics: a visit count (e.g., a number of times a visitor selects web pages of a particular web page category during the session) and a visit duration (e.g., a length of time a visitor spends at web pages of a particular web page category during the session).

More specifically, the value for the feature VisitCount for a category $cat_j$ in a session $S_i$ is the number or "frequency" of visits to the $j^{th}$ category during the $i^{th}$ visitor session. In mathematical terms, $$cat(\text{VisitCount}, S_i) = \{cat_i^1, cat_i^2, \ldots, cat_i^p\},$$

where
$cat_i^j = \text{Frequency}(cat_j)$ in $S_i$, $$cat_i^j = \sum_{j=1}^{p} v_i^j \Bigg| v_i^j = \begin{cases} 1 & \text{if } M(f_{ik}^l) = cat_j \\ 0 & \text{otherwise} \end{cases} \forall C_i \in S_i, \text{ and}$$

$f_{ik}^l$=URL of a web page of the website.

Similarly, the value for the feature VisitDuration for a category $cat_j$ in a session $S_i$ is the summation of visit durations to the $j^{th}$ category during the $i^{th}$ visitor session. In mathematical terms, $$cat(\text{VisitDuration}, S_i) = \{cat_i^1, cat_i^2, \ldots, cat_i^p\},$$

where
$cat_i^j = \text{Frequency}(cat_j)$ in $S_i$ and $$cat_i^j = \sum_{j=1}^{p} v_i^j \Bigg| v_i^j = \begin{cases} f_{ik}^m & \text{if } M(f_{ik}^l) = cat_j \\ 0 & \text{otherwise} \end{cases} \forall C_i \in S_i,$$

$f_{ik}^l$=URL of a web page of the website, and
$f_{ik}^m$=VisitDuration of the visitor at the web page.

With the raw values of $cat_i^j$ calculated for either or both the VisitCount and VisitDuration features, a score associated with a web page category in a session may then be computed based on the associated raw value (operation 704). In this example, the score is a term frequency-inverse document frequency (tf-idf) score. Generally, tf-idf is employed in text processing to assign a value to a word (or n-gram) to indicate the importance of that word to a document among a collection of documents. In a text processing scenario, the tf-idf score of a word increases positively in relation to the number of times the word appears in a particular document, but is offset to some degree by the number of times the word appears in other documents of the collection, thus taking into account that some words are generally more common in the collection than others, and thus may not be as important to a particular document as other words that are used more sparingly across the collection.

In at least some examples, a web page category $cat_i$, a session $S_j$, and the collection of all sessions $S$ may be somewhat analogous to a word/n-gram, document, and the document collection of the text processing scenario described above. Thus, for each raw value Frequency($cat_i$) of a metric corresponding to a web page category $cat_i$ within a particular session $S_j$, a tf-idf score tfidf($cat_i$, $S_j$, $S$) may be generated using matrix operations as follows:

$$tfidf(cat_i, S_j, S) = tf(cat_i, S_j) \times idf(cat_i, S),$$

where $$tf(cat_i, S_j) = \frac{\text{Frequency}(cat_i, S_j)}{\max\{\text{Frequency}(cat, S_j): cat \in S_j\}}, \text{ and}$$

$$idf(cat_i, S) = \log \frac{|S|}{S_j \in S: cat_i \in S \text{ and } cat_i \neq 0}.$$

More generally, tf($cat_i$, $S_j$) represents the frequency of the metric for the category $cat_i$ in the visitor session $S_j$ and idf($cat_i$, $S$) represents the inverse frequency of the metric for the category $cat_i$ across all of the visitor sessions $S$.

In addition, to simplify the determination of the mathematical distance for each session, each of the td-idf scores tfidf($cat_i$, $S_j$, $S$) may be scaled linearly so that all of the scaled scores for a particular feature across all web page categories and visitor sessions range from zero to one. Mathematically speaking, for each score x=tfidf($cat_i$, $S_j$, $S$) for a particular feature within all categories and visitor sessions, a scaled score $x^l$ may be generated using a minimum score $x_{min}$ and a maximum score $x_{max}$ for the same feature within all categories and visitor sessions as follows:

$$x^l = \frac{x - x_{min}}{x_{max} - x_{min}}.$$

Figure 8:
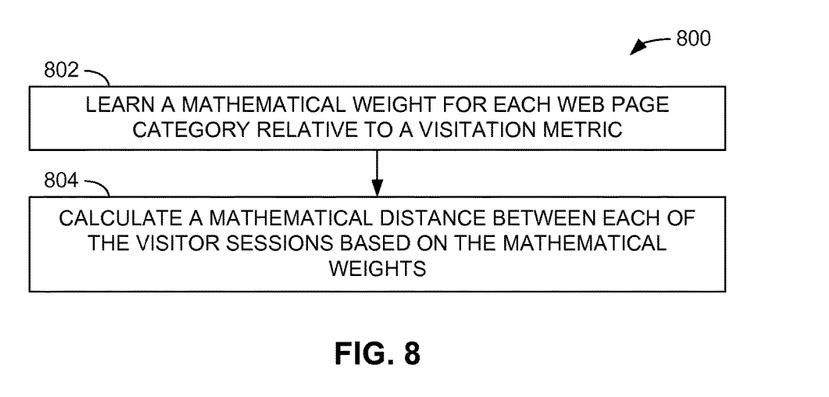
FIG. 8 is a flow diagram of an example method of calculating a mathematical distance between each of the visitor sessions based on the score for each webpage category of each visitor session.

FIG. 8 is a flow diagram of an example method 800 of calculating a mathematical distance between each of the visitor sessions based on the scores for each web page category associated with a visitor session. In one example, each score $x^l$ for each web page category within a particular session may be designated as dimensions $x^1$, $x^2$, and so on of a feature vector $\vec{x} = \{x^1, x^2, \ldots\}$ for each feature (e.g., VisitCount or VisitDuration) in a specific visitor session. Given a feature vector $\vec{x}$ associated with a feature for each visitor session, a mathematical distance between each vector $\vec{x}$ may then be calculated to determine a similarity between the visitor sessions with respect to that particular feature.

In the method 800, a mathematical weight may be learned or generated for each web page category relative to a visitation feature or metric (operation 802). In one implementation, a standard Euclidean distance metric that assigns equal weights to each web page category may be employed to determine a distance metric D between two feature vectors $\vec{x}_i$, $\vec{x}_j$ as $$D(\vec{x}_i, \vec{x}_j) = (\vec{x}_i - \vec{x}_j)^T (\vec{x}_i - \vec{x}_j),$$

where T denotes the transpose matrix.

However, in at least some environments, equal weighting of the various dimensions of the feature vector x may not result in optimal results for identifying a target group of visitor sessions. Accordingly, in some implementations, a Euclidean distance within a transformed space that allows dimension-specific weighting (e.g., different weights for different web page categories for a particular feature) may be determined by introducing a covariance matrix L into the distance function D, resulting in the function D being expressed as $$D(\vec{x}_i, \vec{x}_j) = (\vec{x}_i - \vec{x}_j)^T L^T L (\vec{x}_i - \vec{x}_j),$$

which transforms to $$D(\vec{x}_i, \vec{x}_j) = (L\vec{x}_i - L\vec{x}_j)^T (L\vec{x}_i - L\vec{x}_j),$$

which provides a metric that represents a Euclidean distance in a transformed space. In some examples, the resulting metric may be termed a Mahalanobis metric. In implementations described herein, the Mahalanobis metric is used to provide a distance measurement in a large margin nearest neighbor (LMNN) algorithm, which may be employed to improve the accuracy of a group classification system, such as a k-nearest neighbor (kNN) algorithm.

More specifically, to learn the mathematical weights, a positive semi-definite matrix $M=L^T L$, which embodies these mathematical weights, may be determined, thus resulting in the Mahalanobis metric being restated as:

$$D(\vec{x}_i, \vec{x}_j) = (\vec{x}_i - \vec{x}_j)^T M (\vec{x}_i - \vec{x}_j).$$

To determine or learn the matrix M, a convex optimization problem may be solved with additional constraints, thus reformulating that problem as a semi-definite program (SDP). Stated another way, an SDP in this example is essentially a linear program with additional constraints that is used to ensure that the generated matrix M is positive semi-definite. A set of training data that includes a set of known feature vectors $\vec{x}$ for a set of visitor sessions, along with their known group or class labels p (e.g., the target group or the non-target group) is provided as input to the SDP to generate the matrix M. In one implementation, the SDP is formulated to minimize the following optimization function:

$$\Sigma_{ij} \eta_{ij} D(\vec{x}_i, \vec{x}_j) + c \Sigma_{ijk} \eta_{ij} (1-p_{ij}) \varepsilon_{ijk},$$

where $p_{ij} \in 0, 1$ indicates whether labels $p_i$ and $p_j$ match (e.g., when $p_{ij}=1$), $\eta_{ij} \in 0, 1$ indicates whether $\vec{x}_i$ and $\vec{x}_j$ are target neighbors (e.g., when $\eta_{ij}=1$), and $\varepsilon_{ijk}$ is a slack variable having an upper bound or limit of $[1+D(\vec{x}_i, \vec{x}_j) - D(\vec{x}_i, \vec{x}_k)]$. Generally, a slack variable may be employed to transform an inequality constraint into an equality constraint, which may be useful in optimization and linear programming problems.

For every data point $x_i$, a set of k target neighbors are initially identified. The target set, as indicated by $\eta_{ij}=1$, may remain unchanged during the learning or training process. In addition, c may be a positive constant that is set by cross-validation, in which results obtained by using the training data set are compared against results obtained via at least one test data set. Generally, the first term of the optimization function penalizes large distances between each data point and its target neighbors, while the second term penalizes small distances between each data point and all other data points with different labels.

The SDP may also include additional constraints, as mentioned above. In this particular example, three additional constraints are employed:

$$D(\vec{x}_i, \vec{x}_k) - D(\vec{x}_i, \vec{x}_j) \geq 1 - \varepsilon_{ijk},$$

$$\varepsilon_{ijk} \geq 0, \text{ and}$$

$$M \succeq 0.$$

The first two constraints place limits on the amount that the distances calculated for use in the SDP may vary, and the third constraint maintains that the matrix M being generated is positive semi-definite. In one example, the matrix M is semi-definite if the value z*Mz is real and greater than or equal to zero for all non-zero complex vectors z, where z* is the conjugate transpose of z.

Generally, the LMNN algorithm is intended to improve the accuracy of the classification operation (operation 408 of FIG. 4) that is to follow. In some examples, accuracy may be improved additionally by addressing the possibility of class or group imbalance, in which the majority class (e.g., the class including more members or data points) is much larger than the minority class (e.g., the class including fewer members or data points). In such examples, it may be beneficial to employ differential weights in the second term of the optimization function presented above so that the scenario of a minority class member residing in the neighborhood of majority class members has a different effect on the optimization function than the scenario of a majority class member located in the neighborhood of minority class members. The use of differential weights may then result in a new optimization function:

$$\Sigma_{ij} \eta_{ij} D(\vec{x}_i, \vec{x}_j) + c \Sigma_{ijk} \eta_{ij} (1-p_{ij})(w_0)(1-p_i) \varepsilon_{ijk} + cc \Sigma_{ijk} \eta_{ij} (1-p_{ij})(w_1)(p_i) \varepsilon_{ijk},$$

where $w_0$ is the differential weight associated with a minority class sample in a neighborhood of the majority class, and $w_1$ is the differential weight corresponding to a majority class sample located in a neighborhood of the minority class. In one example, $w_1 \gg w_0$ so that the majority class samples are severely penalized for lying in the vicinity of minority class samples compared to their minority class counterparts.

In further referencing FIG. 8, once the mathematical weights are learned for each web page category relative to one or more visitation metrics (operation 802), presumably using some training data set in which the group or class labels (e.g., a target class, such as a visitor session that results in a product or service purchase, and a non-target class), a mathematical distance between each of the visitor sessions to be grouped or classified may then be calculated using the mathematical weights (operation 804). More specifically, in at least one example, the matrix M, which embodies the learned weights, may then be employed to generate the Mahalanobis metric for each visitor session represented in test data that is unlabeled as belonging to either the target group or the non-target group. As explained above, for any particular feature, the mathematical distance (in this case, the Mahalanobis metric) between any two visitor sessions $\vec{x}_i$ and $\vec{x}_j$ based on the scores for the categories for the visitors sessions may then be calculated (operation 804) using the matrix M:

$$D(\vec{x}_i, \vec{x}_j) = (\vec{x}_i - \vec{x}_j)^T M (\vec{x}_i - \vec{x}_j).$$

The resulting distances $D(\vec{x}_i, \vec{x}_j)$ may then be employed to classify the corresponding visitor sessions into a target group and a non-target group (operation 408 of FIG. 4). In at least some implementations, training samples, the group labels of which are already known, are employed to classify the test data, which have unknown labels, according to a neighborhood majority voting scheme. In one example, those visitor sessions that resulted in a purchase from the website are labeled as residing in the target group, while those visitor sessions that did not result in a purchase are labeled as belonging to the non-target group. As mentioned above, one particular classification algorithm that may be utilized is the k-nearest neighbor (kNN) algorithm.

More specifically, using kNN, a test point corresponding to a visitor session is labeled according to a majority vote of the k-nearest neighbors, according to the calculated mathematical distance between the visitor session in question and its neighboring visitor sessions. In other words, for a visitor session $S_i^{test}$ in a test set that is to be labeled, and $S_{i,train} = \{S_{i,train}^1, S_{i,train}^2, \ldots, S_{i,train}^k\}$ are the nearest k labeled visitor sessions of a training set, the label $p_i^{test}$ of $S_i^{test}$ is decided by majority voting of the nearest k-labeled visitor sessions. More specifically, $$p_i^{test} = \begin{cases} 1 & \text{if Frequency}(p_j = 1) > \text{Frequency}(p_j = 1) \\ 0 & \text{otherwise} \end{cases},$$

where each $p_j$ corresponds with $S_{i,train}^j \forall S_{i,train}^j \in S_{i,train}$.

In some examples, a split between the amount of training data and the amount of test data employed in either or both of the learning of the matrix M or the classifying of visitors sessions using kNN may be approximately 80% to 20%. Also, in some implementations, k may be in the range of five to thirteen, with higher values generally providing more precise results. However, any training-to-test data split and/or value for k may be employed in other embodiments.

Based on the classification, visitors identified with the newly-labeled visitor sessions that have been classified as part of the target group or class may then become the focus of one or more marketing and/or sales activities of the website, such as target advertising, coupons, discounts, special offers, and other activities directed to specific users or groups of users.

Moreover, based on new visitor session data, including visitor session data associated with both new users and previous users, the methods discussed above may be performed periodically, such as, for example, once a day or week. The resulting classification or labeling of new visitor sessions may then be employed to direct new advertising or offers on an ongoing basis.

As a result of at least some of the embodiments described above, information gathered regarding previous visitor sessions involving a particular website may be used to identify similar sessions corresponding to users that may be responsive to particular marketing or sales activities, thus potentially increasing conversion rates. Accordingly, advertising and sales activities employing a determination of session similarity may result in greater economic return compared to sales and marketing activities that are directed to users either in a random fashion or based on static information, such as user demographics.

While the particular embodiments discussed above almost exclusively address the identification of a target group of potential purchasers of products and services provided via a website, other types of target groups may be identified utilizing those embodiments. For example, one or more target groups that show an interest in a particular portion of a website may be identified. Based on such identification, additional information that may be of particular interest, such as links to this or other websites with related information, may be directed to the users belonging to those specific target groups.

Figure 9:
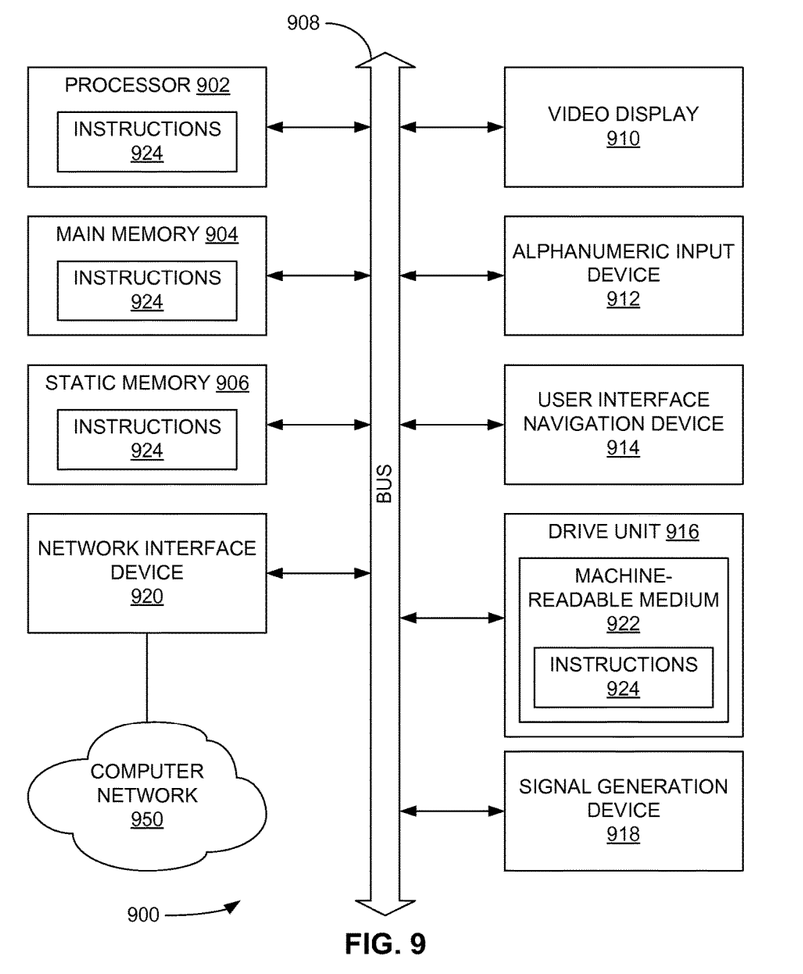
FIG. 9 is a block diagram of a machine in the example form of a processing system within which may be executed a set of instructions for causing the machine to perform any one or more of the methodologies discussed herein.

FIG. 9 depicts a block diagram of a machine in the example form of a processing system 900 within which may be executed a set of instructions 924 for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 900 includes a processor 902 (e.g., a central processing unit (CPU), a graphics processing unit (GPU), or both), a main memory 904 (e.g., random access memory), and static memory 906 (e.g., static random-access memory), which communicate with each other via bus 908. The processing system 900 may further include video display unit 910 (e.g., a plasma display, a liquid crystal display (LCD), or a cathode ray tube (CRT)). The processing system 900 also includes an alphanumeric input device 912 (e.g., a keyboard), a user interface (UI) navigation device 914 (e.g., a mouse), a disk drive unit 916, a signal generation device 918 (e.g., a speaker), and a network interface device 920.

The disk drive unit 916 (a type of non-volatile memory storage) includes a machine-readable medium 922 on which is stored one or more sets of data structures and instructions 924 (e.g., software) embodying or utilized by any one or more of the methodologies or functions described herein. The data structures and instructions 924 may also reside, completely or at least partially, within the main memory 904, the static memory 906, and/or within the processor 902 during execution thereof by the processing system 900, with the main memory 904, the static memory 906, and the processor 902 also constituting machine-readable, tangible media.

The data structures and instructions 924 may further be transmitted or received over a computer network 950 via network interface device 920 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 900) or one or more hardware modules of a computer system (e.g., a processor 902 or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 902 or other programmable processor) that is temporarily configured by software to perform certain operations. It will be appreciated that the decision to implement a hardware module mechanically, in dedicated and permanently configured circuitry, or in temporarily configured circuitry (for example, configured by software), may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules include a general-purpose processor 902 that is configured using software, the general-purpose processor 902 may be configured as respective different hardware modules at different times. Software may accordingly configure a processor 902, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses that connect the modules). In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and may operate on a resource (for example, a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 902 or processor-implemented modules. The performance of certain of the operations may be distributed among the one or more processors 902, not only residing within a single machine but deployed across a number of machines. In some example embodiments, the processors 902 may be located in a single location (e.g., within a home environment, within an office environment, or as a server farm), while in other embodiments, the processors 902 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method of classifying web visitor sessions based on clickstreams, the method comprising:
utilizing a visitor session classification system to:
organize, utilizing a webpage categorization component of the visitor session classification system, web pages of a single website into web page categories;
divide, utilizing a visitor session determination component, clickstreams of users visiting the website into visitor sessions;
generate a matrix of weights corresponding to the web page categories relative to web page interactions to provide weightings for the web page categories, wherein each weight is applied based on a type of web page interaction, the matrix including a first weight for a first web page category relative to a first type of web page interaction;
determine, by at least one processor of a machine running an intersession distance component, an extent of similarity between a first visitor session of a first user and a second visitor session of a second user by comparing a first set of web page interactions, including the first type of web page interaction, by the first user corresponding with the first web page category to a second set of web page interactions by the second user corresponding with the first web page category, wherein the extent of similarity is determined based at least in part on applying the first weight to the first web page category relative to the first type of web page interaction;
classify, utilizing a visitor session classification component, the second visitor session into one of a target group or a non-target group based on the extent of similarity between the first visitor session and the second visitor session where the first visitor session is identified as corresponding to the target group based on an interaction with the website by the first user; and directing targeted information related to the website to the second user when the second visitor session is classified into the target group based on the extent of similarity between the first visitor session and the second visitor session.

2. The method of claim 1, wherein the interaction with the website comprises a purchase of at least one product or service via the website, and wherein the target group comprises a target market segment for the at least one product or service.

3. The method of claim 1, wherein the web page categories comprise at least one of a home page category, a product page category, a user account page category, an online shopping cart page category, a search page category, and a help page category.

4. The method of claim 1, wherein the dividing of the clickstreams of the users to visit the website into the visitor sessions comprises:

detecting, for each user gaps in the clickstream of the user that exceed a predetermined length of time; and dividing, for each user the clickstream into visitor sessions according to the detected gaps.

5. The method of claim 1, wherein the interaction by the first user with the first web page category includes a visitation count of webpages of the first web page category during the first visitor session.

6. The method of claim 1, wherein the first set of web page interactions by the first user with the first web page category includes a visitation duration for webpages of the first web page category during the first visitor session.

7. The method of claim 1, wherein the determining of the extent of similarity between the first and second visitor sessions comprises:

determining a raw value for visitation metrics of the first set of web page interactions of the first visitor session; and computing a score for the visitation metrics based at least on the raw values of the visitation metrics for the first web page category;

determining a raw value for visitation metrics of the second set of web page interactions of the second visitor session; and computing a score for the visitation metrics of the second visitor session based at least on the raw values of the visitation metrics for the first web page categories.

8. The method of claim 7, wherein the scores for visitation metrics of the first and second visitor sessions comprise term frequency-inverse document frequency scores.

9. The method of claim 7, wherein the determining of the extent of similarity between the first and second visitor sessions further comprises linearly scaling the scores for the visitation metrics of the first and second visitor sessions.

10. The method of claim 1, wherein generating the matrix of weights includes employing large margin nearest neighbor classification.

11. The method of claim 1, wherein generating the matrix of weights includes employing differential weights depending on a size of the target group relative to the non-target group.

12. The method of claim 1, wherein the classifying the first visitor session into the target group or the non-target group employs a k- nearest neighbor algorithm.

13. A non-transitory computer-readable storage medium comprising instructions that, when executed by at least one processor of a machine, cause the machine to perform operations comprising:

organizing web pages of a single commercial website into web page categories:

dividing a clickstream of a first user visiting the commercial website into visitor sessions;

training a module of a visitor session classification system to apply a matrix of weights corresponding to the web page categories relative to web page interactions to provide weightings for the web page categories, wherein each weight is applied based on a type of web page interaction, the matrix including a first weight for a first web page category relative to a first type of web page interaction;

determining, using the trained module, an extent of similarity between a first visitor session of the first user and a second visitor session of the second user by comparing a first set of web page interactions, including the first type of web page interaction, by the first visitor corresponding with the first web page category to a second set of web page interactions by the second visitor corresponding with the first web page category, wherein the extent of similarity is determined based at least in part on applying the first weight to the first web page category relative to the first type of web page interaction; and classifying, utilizing the visitor session classification system, the second visitor session into a target market group based on the extent of similarity between the first visitor session and the second visitor session where the first visitor session is identified as corresponding with the target group based on a transaction via the commercial website associated with the target group, the classification of the second visitor session into the target group resulting in targeted information related to the commercial website being sent to the second user.

14. A system comprising:

at least one processor; and memory comprising instructions that, when executed by the at least one processor, cause the at least one processor to perform operations comprising:

running a visitor session classification system to perform:

organizing web pages of a single website into web page categories;

dividing a clickstream of each user to visit the website into a plurality of visitor sessions;

generating, utilizing a category weight determination component, a matrix of weights corresponding to the web page categories relative to web page interactions to provide weightings for the web page categories, wherein each weight is applied based on a type of web page interaction, the matrix including a first weight for a first web page category relative to a first type of web page interaction;

determining, an extent of similarity between a first visitor session of a first user and a second visitor session of a second user by comparing a first set of web page interactions, including the first type of web page interaction, by the first user corresponding with the first web page category to a second set of web page interactions by the second user corresponding with the first web page category, wherein the extent of similarity is determined based at least in part on applying the first weight to the first web page category relative to the first type of web page interaction;

classifying the second visitor session into a target group or a non-target group based on the extent of similarity between the first visitor session and the second visitor session where the first visitor session is identified as corresponding to the target group based on an interaction with the website by the first user; and directing targeted information related to the website to the second user when the second visitor session is classified into a target group.

15. The system of claim 14, wherein the interaction with the website comprises a purchase of at least one product or service via the website, and wherein the target group comprises a target market segment for the at least one product or service.

16. The system of claim 14, wherein the first measurable aspect of the first set of interactions by the first user with the first web page category comprises at least one of a visitation count of webpages of the first web page category during the first visitor session and a visitation duration of webpages of the first web page category for the first visitor session.

17. The system of claim 14, wherein the determining of the extent of similarity between each of the visitor sessions comprises:

determining a raw value for visitation metrics of the first set of interactions of the first visitor session and visitation metrics of the second set of interactions of the second visitor session; and computing a score for the visitation metrics of the first and second visitor sessions based at least on the raw values of the visitation metrics for the first and second visitor sessions; and linearly scaling each of the scores for the visitation metrics of the first and second visitor sessions;

wherein the scores for the visitation metrics of the first and second visitor sessions comprise term frequency-inverse document frequency scores.

18. The system of claim 14, wherein the classifying of each of the visitor sessions into the target group and the non-target group employs a k-nearest neighbor algorithm.

* * * * *

UNITED STATES PATENT AND TRADEMARK OFFICE
CERTIFICATE OF CORRECTION

PATENT NO. : 10,115,121 B2
APPLICATION NO. : 14/103056
DATED : October 30, 2018
INVENTOR(S) : Deepak Pai et al.

Page 1 of 1

It is certified that error appears in the above-identified patent and that said Letters Patent is hereby corrected as shown below:

In the Specification

Column 9, Line 2: Please remove "x" and replace with --  --.

Signed and Sealed this
Ninth Day of July, 2019

Andrei Iancu
*Director of the United States Patent and Trademark Office*